United States Patent [19]

Molders et al.

[11] Patent Number: 4,513,953
[45] Date of Patent: Apr. 30, 1985

[54] GAS SPRING WITH EXTENSION FORCE CONTROLLED AS A FUNCTION OF TEMPERATURE

[75] Inventors: Werner Molders, Plaidt; Rolf Langanke, Boppard; Egon Sentinger, Koblenz; Hermann Reuschenbach, Rossbach, all of Fed. Rep. of Germany

[73] Assignee: Gas Spring Company, Division of Fichtel & Sachs Industries, Inc., Colmar, Pa.

[21] Appl. No.: 485,055

[22] Filed: Apr. 14, 1983

[51] Int. Cl.³ ............................................... F16F 9/52
[52] U.S. Cl. ......................................... 267/121; 92/1; 248/DIG. 1; 267/64.11
[58] Field of Search ............... 267/34, 64.11, 64.15, 267/64.25, 113, 120, 121; 188/269, 276, 277, 278; 16/51, 52, 53, 66; 280/702, 708, 711, 712; 248/DIG. 1, 576; 92/1, 50, 51, 52, 53, 67, 75, 81, 142, 144

[56] References Cited

U.S. PATENT DOCUMENTS

| 2,882,042 | 4/1959 | Fleckenstein | 267/34 |
| 3,188,072 | 6/1965 | Wustenhagen et al. | 267/64.25 |
| 3,444,830 | 5/1969 | Doetsch | 267/34 |
| 3,917,244 | 11/1975 | Peddinghaus | 267/34 |
| 3,944,197 | 3/1976 | Dachicourt | 188/276 |
| 3,971,551 | 7/1976 | Kendall et al. | 267/64.15 |
| 4,113,071 | 9/1978 | Müller et al. | 267/64.11 |
| 4,373,707 | 2/1983 | Mölders | 267/64.25 |
| 4,408,751 | 10/1983 | Dodson et al. | 267/64.11 |

FOREIGN PATENT DOCUMENTS

| 2428326 | 1/1976 | Fed. Rep. of Germany | 188/277 |
| 2526437 | 12/1976 | Fed. Rep. of Germany . | |
| 3141295 | 4/1983 | Fed. Rep. of Germany . | |
| 54-57077 | 5/1979 | Japan . | |
| 1099734 | 1/1968 | United Kingdom . | |

*Primary Examiner*—Douglas C. Butler
*Assistant Examiner*—Richard R. Diefendorf
*Attorney, Agent, or Firm*—Brumbaugh, Graves, Donohue & Raymond

[57] ABSTRACT

In the illustrative embodiments of the invention disclosed, the extension force of a gas spring is controlled as a function of temperature by varying the volume of the working chamber entered by the piston rod, and thus the gas pressure within the working chamber, as a function of temperature.

11 Claims, 7 Drawing Figures

GAS SPRING WITH EXTENSION FORCE CONTROLLED AS A FUNCTION OF TEMPERATURE

BACKGROUND

1. The Field of the Invention

The present invention relates generally to pressurized gas springs and, in particular, to the provision in such gas springs of means for controlling the extension force, i.e. push-out force, exerted on the piston rod of the spring by the internal gas pressure as a function of temperature.

2. The Prior Art

DE-OS No. 2,526,437 discloses a door closer having a gas spring provided with a throttling valve that is variable as a function of temperature. While this results in a uniform speed of travel of the piston rod over a temperature interval, the extension force of the piston rod is not controlled as a function of temperature. A temperature increase results in a pressure rise in the working chamber of the gas spring, and hence an extension force that increases proportionally to the temperature rise.

SUMMARY

The object of the present invention is to provide a gas spring in which the extension or push-out force on the piston rod is maintained within desired limits regardless of variations in ambient temperature.

According to the invention, this object is achieved by providing a movable partition as one boundary of the working space of the gas spring and moving the partition, in accordance with change in ambient temperature, so as to vary the volume of the working chamber as needed to maintain a substantially constant gas pressure within the working space. Thus it is possible through this arrangement to maintain the extension force of the gas spring within desired limits as the temperature varies. If some change in the extension force is desired, this can be brought about by a more than proportional volume change in the working space, e.g., by enlargement of the working space with rising temperature or decrease of the working space with falling temperature.

According to one feature of the invention, the movable partition comprises a parting piston arranged to be axially movable relative to the gas spring cylinder and sealed against it, the parting piston being in operative communication with a chamber containing an expansion medium. The expansion medium may advantageously be a suitable fluid, but, alternatively, it may consist of other suitable materials or members which change length or volume as a function of temperature. Thus, for example, the parting piston may well be in active connection with bimetallic or expansion elements. The parting piston may advantageously be linked to the chamber containing the expansion medium by means of a central connecting rod that protrudes into and is sealed off against the chamber containing the expansion medium.

Since the parting piston is acted upon by the gas pressure prevailing in the working chamber, any undesired variation in volume of the working chamber as a function of pressure is counteracted, according to the invention, in that the parting piston is also acted upon by a spring force acting contrary to the gas pressure in the working chamber. The spring force acting on the parting piston may be provided by a gas spring, coil spring, cup spring, or any other suitable spring, its force being expediently dimensioned so as to exceed the force exerted on the parting piston by the pressure in the working chamber.

According to another feature of the invention, the connecting rod attached to the parting piston is fitted, at the end away from the parting piston, with a disc piston forming a movable, sealed boundary wall for the chamber filled with expansion medium. A favorable embodiment may thus be obtained, in accordance with the invention, by arranging the parting piston between the working chamber and a gas chamber acting as spring, this chamber being filled with gas under pressure and bounded from the chamber filled with expansion medium by a fixed partition in the vessel, while the connecting rod is guided and sealed axially movable in the partition fixed in the vessel.

In another embodiment, the parting piston is arranged between the working chamber and a gas chamber furnished with a vent orifice, this chamber being bounded from the chamber filled with expansion medium by the fixed partition in the vessel, whereas the movable and sealed disc piston connected to the parting piston by way of the connecting rod is acted upon by a spring on the side of the piston away from the expansion medium. This spring, as aforementioned, may consist of a gas spring, a coil spring or a cup spring. In a further refinement of this feature of the invention, the partition controlled as a function of temperature is connected to a pot-shaped part enclosing the vessel, while the vessel, at its piston rod exit end, has an outer jacket, the partition being guided and sealed on the outside surface of the vessel and the inside surface of the jacket, bounding the chamber containing the expansion medium on one side and acted upon by a spring on the other side.

Another modified embodiment of the invention has the feature of a vessel arranged inside an outer jacket, said outer jacket being of greater axial length than the vessel and with it forming an annular space serving to accommodate the expansion medium. In this embodiment, it is preferable for the disc piston to be guided and sealed against the inside wall of the outer jacket, while the parting piston slides on the inside wall of the vessel and the chamber containing the expansion medium is bounded by the parting piston and the disc piston.

Another advantageous embodiment of the invention is obtained by providing the fixed partition in the vessel with passages for the gas under pressure in the working chamber and supporting the chamber containing the expansion medium from the fixed partition, while the connecting rod connected to the parting piston enters the chamber filled with the expansion medium on the face opposed to the partition. The parting piston is acted on by the pressure in the working chamber on the one side and by the spring on the other side.

BRIEF DESCRIPTION OF THE DRAWINGS

With reference to the embodiments shown in the drawings by way of example, the invention will now be illustrated in further detail. In the drawings.

DETAILED DESCRIPTION

Figure 1:
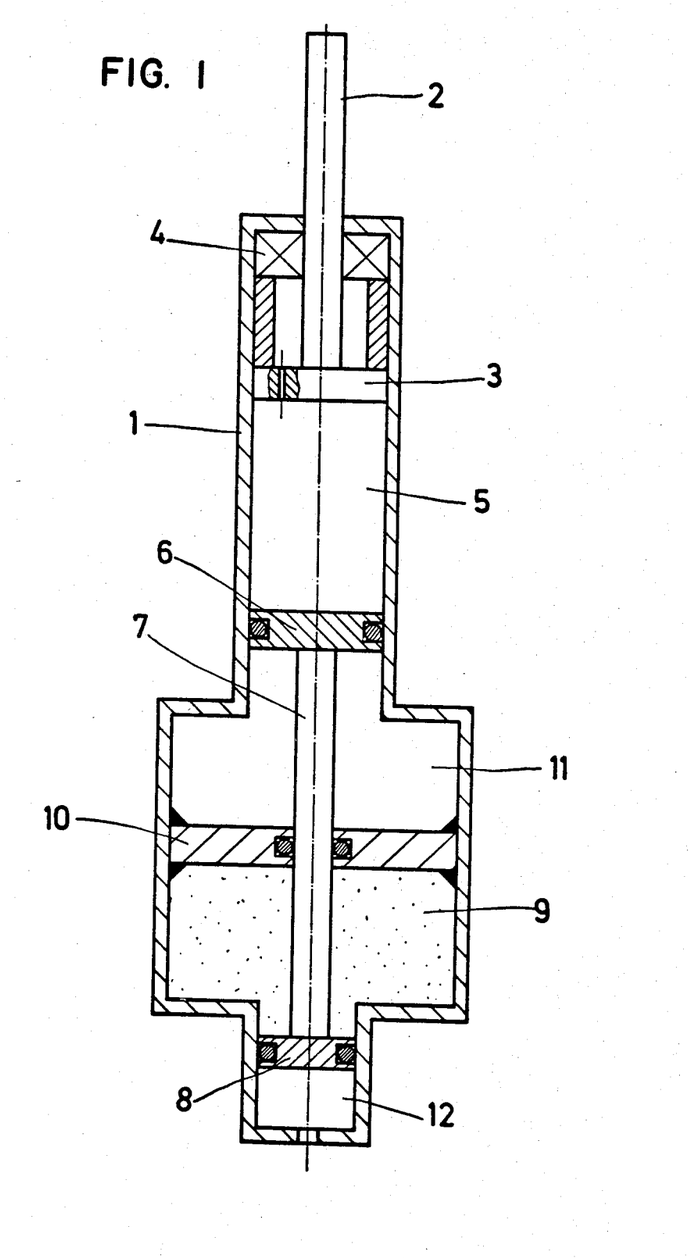
FIG. 1 shows a schematic representation, in longitudinal section, of one embodiment of a temperature-compensated gas spring of the invention.

The gas spring shown in FIG. 1 consists of a vessel 1 on the inside wall of which slides a piston 3 connected to a piston rod 2. A working chamber 5 defined in the interior of this vessel 1 contains a volume of gas under pressure, whereby an extension force is exerted on the piston rod 2 equal to the product of the gas pressure and the cross sectional area of the piston rod. The piston rod 2 is sealed off by means of a seal 4 located at the end of the vessel where the piston rod emerges. For control of the extension force as a function of temperature, the working chamber 5 is bounded by a movable parting piston 6, which is connected via a connecting rod 7 to a disc piston 8. The connecting rod 7 is guided and sealed in a fixed partition 10.

Between the parting piston 6 and the fixed partition 10, the vessel 1 contains a chamber 11 filled with gas under pressure, this pressure being so chosen that the force exerted thereby on the parting piston 6 is equal to or somewhat greater than the force exerted on the parting piston 6 by the gas in the working chamber 5. A second chamber 9, filled with expansion medium, is located between the fixed partition 10 and the disc piston 8, the disc piston 8 representing a movable wall of the chamber 9. On the side of the disc piston 8 opposed to the expansion medium, a vented chamber 12 is provided which communicates with the atmosphere by way of a constantly open port.

The gas pressure in the working chamber 5 is so chosen that the piston rod 2 attains the desired extension force. When the temperature rises, the expansion medium contained in chamber 9 expands and causes the disc piston 8 to travel farther away from the fixed partition 10. At the same time, the parting piston 6 connected to the disc piston 8 by way of the connecting rod 7 executes the same travel, thereby enlarging the working chamber 5, whereby the pressure rise in the working chamber as a result of the temperature rise is compensated and the piston rod provides the same extension force. By suitable choice of expansion medium and volume of chamber 9, it is readily possible to achieve a complete compensation of extension force with varying temperature, or else a slightly progressive or degressive characteristic of the extension force of piston rod 2. A special fluid is preferably selected as the expansion medium, but other suitable materials may readily be substituted.

Upon cooling, the volume of the expansion medium in chamber 9 is reduced, so that the disc piston 8 moves towards the fixed partition 10, and the parting piston 6 diminishes the working chamber 5 correspondingly. Thus the spring action of the chamber 11 with volume of gas under pressure acts on the parting piston 6, and contrary to the pressure in the working chamber 5. In this way the retraction and extension force of the gas spring may be controlled as a function of temperature, the extension speed of the piston rod being obtained by the damping means provided in piston 3 and represented as a throttling orifice.

Figure 2:
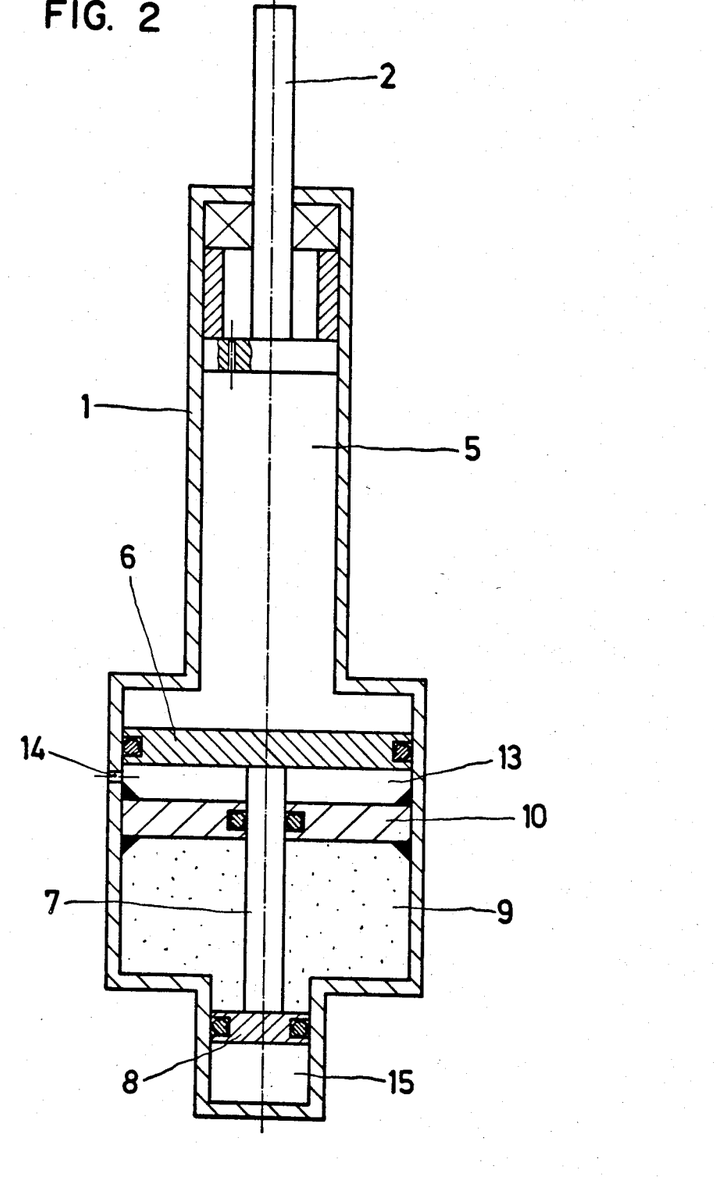
FIG. 2 shows a gas spring, represented schematically, where the disc piston bounding the expansion medium is acted upon on the other side by a fluid spring.

In the embodiment of FIG. 2 (wherein like parts bear like numbers), the working chamber 5 in vessel 1 is likewise bounded by a parting piston 6. The parting piston 6 is here accommodated in a chamber of larger diameter in the vessel, and is again connected to the disc piston 8 by a connecting rod 7. Between the fixed partition 10 and the parting piston 8, there is a gas chamber 13 communicating with the atmosphere by way of a vent 14.

When the temperature rises, the expansion medium in chamber 9 expands and causes the disc piston 8 to travel against the force of the gas pressure in chamber 15. The gas pressure in chamber 15 thus acts as a spring on the disc piston 8, the spring action being directed against the force exerted on the parting piston 6 from the working chamber 5. This temperature-related displacement of the parting piston 6, and hence the change in volume of working chamber 5, controls the extension force of piston rod 6 as a function of temperature in the same manner as before.

Figure 3:
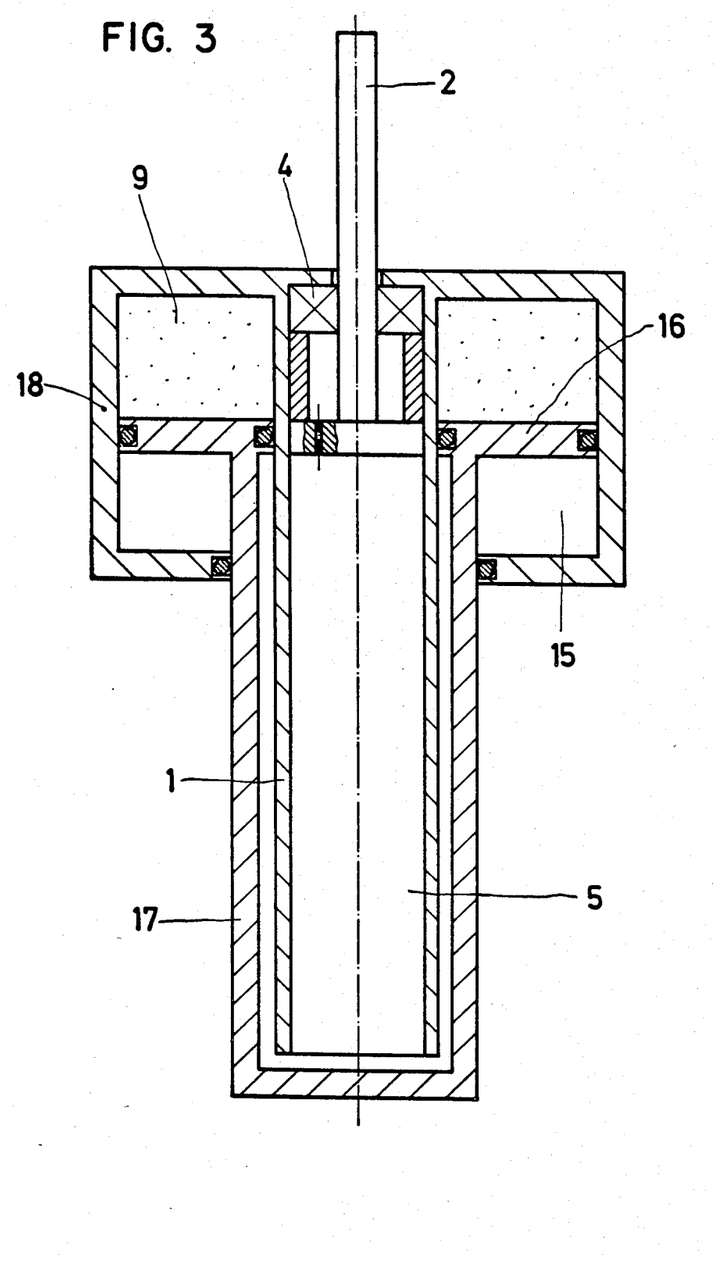
FIG. 3 shows a temperature-compensated gas spring having a parting piston of annular shape.

The gas spring of FIG. 3 has a vessel 1 associated with a jacket 18. Between the inside wall of the jacket 18 and the outside wall of the vessel 1, an annular parting-piston system 16 is arranged. This parting piston 16 is connected with a pot-shaped part 17 enclosing the vessel 1. The working chamber 5, containing a volume of gas under pressure, consists in this embodiment of the interior of vessel 1 and the annular space between vessel 1 and the pot-shaped part 17. The chamber 9 containing the expansion medium is located between the outside surface of vessel 1, the inside surface of jacket 18, and the face at the end where the piston rod emerges. The chamber 9 is bounded by the parting piston 16, whose other face is acted upon by the gas pressure in chamber 15. The piston rod seal 4 seals the piston rod 2 against the working chamber 5.

Upon rise of temperature, the expansion medium present in chamber 9 expands and effects a travel of the parting piston 16 against the force due to the gas pressure in chamber 15. Thus the displacement of the parting piston 16 and pot-shaped part 17 operates to enlarge the working chamber 5, and so counteracts a pressure build-up in chamber 5 due to temperature rise.

Figure 4:
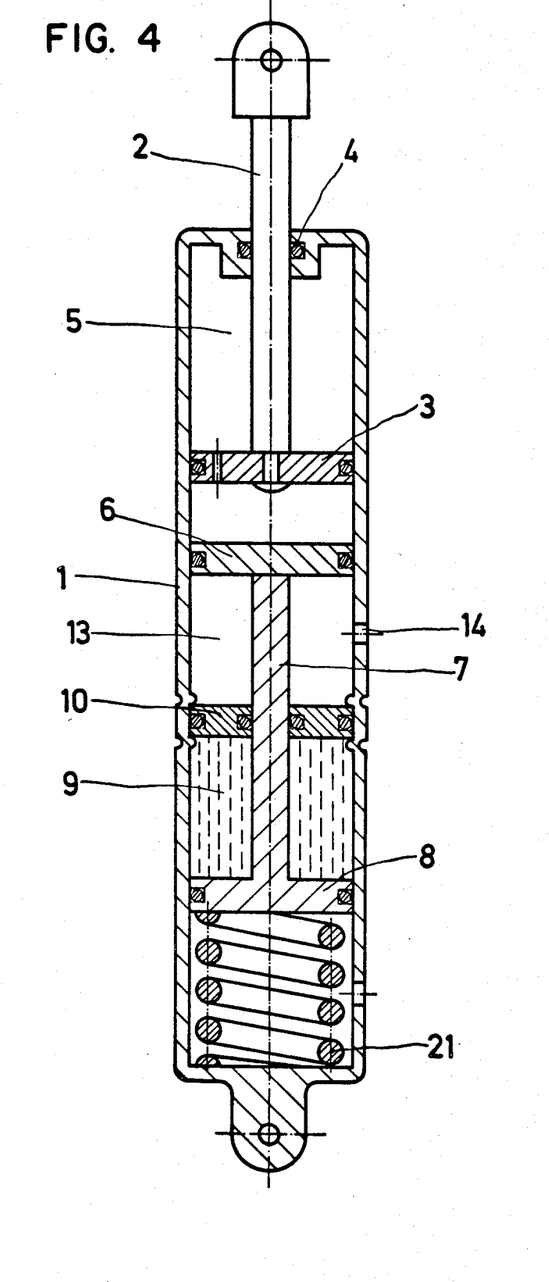
FIG. 4 shows an embodiment of a temperature-compensated gas spring wherein the disc piston connected with the parting piston is acted upon on one side by a coil spring.

The gas spring of FIG. 4 is provided with a tubular vessel 1, of constant diameter throughout its length. At the end where the piston rod emerges, the piston rod 2 is sealed by means of a piston rod seal 4. The working chamber 5, with volume of gas under pressure, is subdivided by the piston 3, which is connected to the piston rod 2 and provided with a throttling orifice. To control the extension force on piston rod 2 as a function of temperature, the working chamber 5 is bounded by a parting piston 6 which is sealed against the inside wall of the vessel. Between a partition 10 fixed in the vessel 1, by means of indentations, and the parting piston 6, there is a gas chamber 13 with vent opening 14. On the other side of the fixed partition 10 is provided a chamber 9 containing the expansion medium, bounded by the disc piston 8, which piston 8 is acted upon by a coil spring 21 on the side opposed to chamber 9. This gas spring is thus essentially similar in structure to that of FIG. 2. Here, again, when the temperature rises, volume gain of the expansion medium in chamber 9 brings about a corresponding enlargement of the working chamber 5 by movement of the parting piston 6, and thus provides temperature compensation of the extension force of the piston rod 2.

Figure 5:
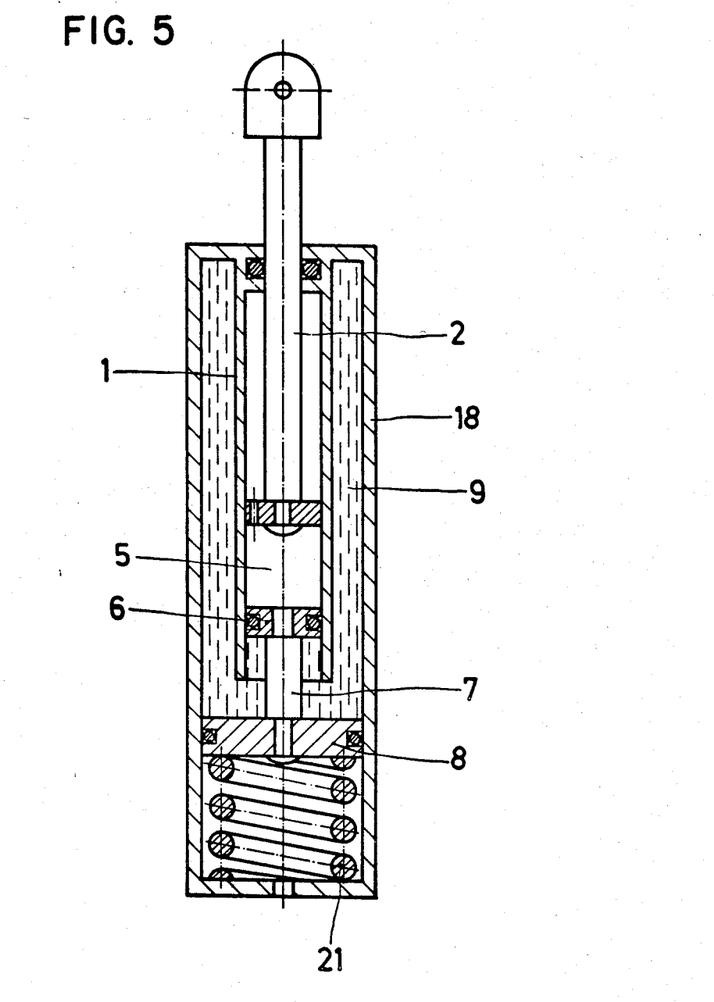
FIG. 5 shows a gas spring in longitudinal section, where the vessel is enclosed in an outer jacket to form an annular chamber to accommodate the expansion medium.
Figure 6:
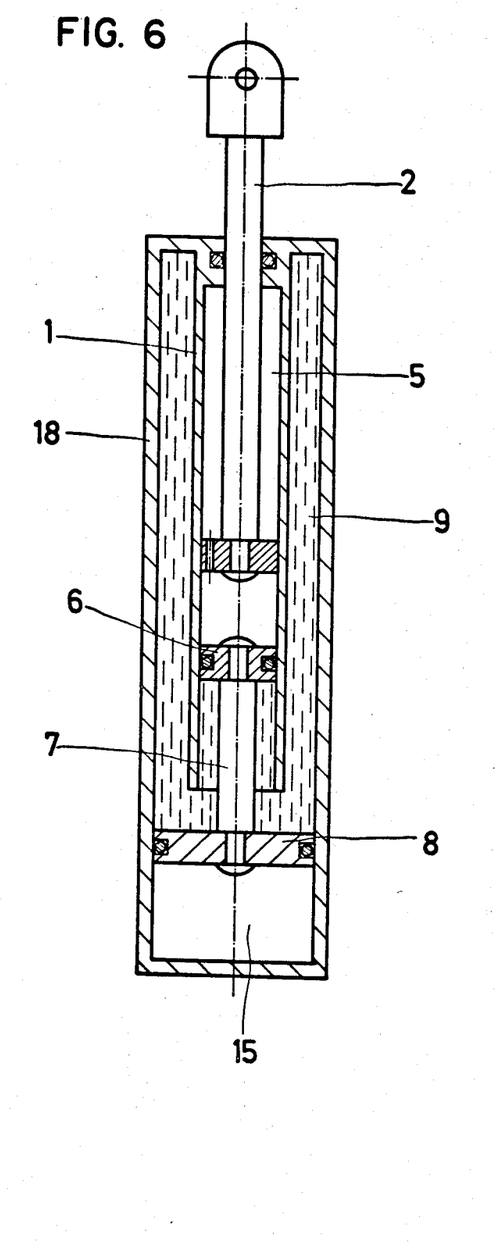
FIG. 6 shows a gas spring the disc piston of which bounds a chamber under gas pressure.

The gas springs of FIGS. 5 and 6 have tubular jackets 18 enclosing the vessels 1, which in turn enclose a working chamber 5 into which chamber the piston rod 2 extends. Between the outside wall of vessel 1 and the inside wall of jacket 18, an annular chamber is formed, representing the chamber 9 containing the expansion medium. The parting piston 6, provided with a comparatively small area compared to the disc piston 8, is connected to the piston 8 by way of a connecting rod 7 and is guided in sealing relation along the inside wall of vessel 1. In the embodiment of FIG. 5, the disc piston 8 is acted upon by a coil spring 21; and in the embodiment of FIG. 6, it is acted upon by a spring consisting of the gas pressure chamber 15. When the temperature rises, the expansion medium in chamber 9 expands and displaces the disc piston 8 against the force of the spring—coil spring 21 or spring chamber 15, respectively—so that the volume of working chamber 5 is varied as a function of temperature in the same manner as before. Accordingly, the extension force on the piston rod 2 may be kept constant or varied according to a desired function over a temperature interval.

Figure 7:
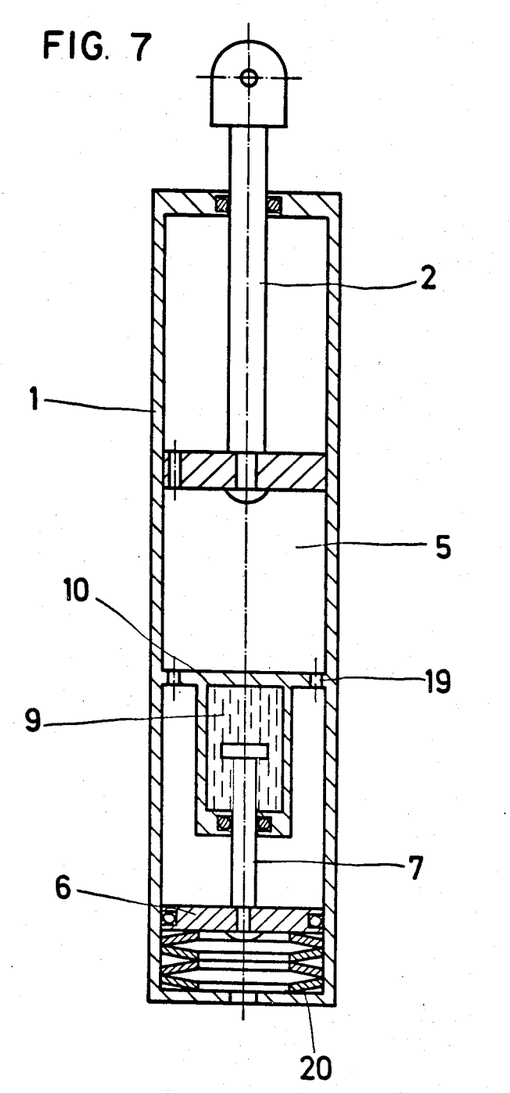
FIG. 7 shows a gas spring in longitudinal section, where a fixed partition provided with passages bears the chamber containing the expansion medium.

FIG. 7 shows a gas spring in which the working chamber 5, containing a volume of gas under pressure, is enlarged by passages 19 arranged in the fixed partition 10. The working chamber 5 in vessel 1 is entered by the piston rod 2, and the pressure of the working chamber 5 acts on the parting piston 6. The other side of the parting piston 6 is acted upon by a spring composed of cup springs 20. The fixed partition 10 bears the chamber 9 containing the expansion medium. The chamber 9 is entered by the connecting rod 7 attached to the parting piston 6. When the temperature rises, the connecting rod 7 protruding into chamber 9 is displaced by volume gain of the expansion medium, causing a displacement of the parting piston 6 against the force of the cup springs 20, whereby at the same time a volume gain of working chamber 5 and hence a temperature compensation are achieved.

Although the invention has been described and illustrated herein with reference to specific embodiments thereof, all such embodiments are susceptible of variation and modification without departing from the inventive concepts disclosed. All such variations and modifications, therefore, are intended to be included within the spirit and scope of the appended claims.

We claim:

1. A gas spring comprising a vessel the interior of which contains a volume of gas under pressure and forms a working chamber entered by a piston rod guided within the vessel and sealed off against the outside, the extension force acting on the piston rod being equal to the product of the pressure in the working chamber and the cross-sectional area of the piston rod, wherein the improvement comprises:
    a sliding parting piston defining an axially movable wall of the working chamber and sealed against the vessel; and
    means for moving said parting piston as a function of change in ambient temperature so as to vary the volume of the working chamber in a manner to maintain the extension force within desired limits, said parting-piston moving means comprising a chamber containing an expansion medium and means operatively coupling said sliding parting piston to said expansion chamber.

2. The gas spring according to claim 1, wherein said operatively-coupling means includes a concentric connecting rod coupled at one end to the parting piston and extending at the other end into the chamber containing the expansion medium, said connecting rod being sealed at said other end against said expansion-medium chamber.

3. The gas spring according to claim 2 wherein said parting piston-moving means includes spring means acting upon said parting piston in a direction to counteract the force exerted on said parting piston by the gas pressure in the working chamber.

4. The gas spring according to claim 3, wherein:
    said parting piston is arranged between said working chamber and a gas chamber forming said spring means, said gas chamber containing a volume of gas under pressure and being divided from said expansion-medium chamber by a partition fixed in the vessel, the connecting rod being guided and sealed axially movably in said fixed partition.

5. The gas spring according to claim 4, wherein:
    said fixed partition is provided with passages for the volume of gas under pressure in said working chamber and supports said expansion-medium chamber, the said connecting rod entering said expansion-medium chamber through the face thereof opposed to the fixed partition, said parting piston being acted upon by the pressure in said working chamber on one side and by said spring means on the other side.

6. The gas spring according to claim 5, wherein said spring means comprises one or more cup springs.

7. The gas spring according to claim 3, wherein:
    said parting piston is connected with a pot-shaped part enclosing the vessel, the vessel including a jacket at the end where the piston rod emerges, said parting piston being sealingly guided along the outer surface of the vessel and the inner surface of the jacket and bounding the expansion-member chamber on one side, said spring means acting upon said parting piston on the other side.

8. The gas spring according to claim 2, wherein:
    the connecting rod coupled to said parting piston carries a disc piston at said other end, which disc piston forms a movable and sealed boundary wall for said expansion-medium chamber.

9. The gas spring according to claim 3, wherein:
    said parting piston is arranged between said working chamber and a vented gas chamber, said gas chamber being bounded by a fixed partition from said expansion-medium chamber, the disc piston being connected by the connecting rod to said parting piston and being acted upon by said spring means on the face thereof away from the expansion medium.

10. The gas spring according to claim 8, wherein:
    the vessel is arranged inside a surrounding jacket, said jacket having a greater axial length than the vessel and with it forming an annular chamber comprising said expansion-medium chamber.

11. The gas spring according to claim 10, wherein:
    the disc piston is sealingly guided along the inside wall of the jacket and the parting piston slides on the inside wall of the vessel, the expansion-medium chamber being bounded by said parting piston and said disc piston.

* * * * *

UNITED STATES PATENT AND TRADEMARK OFFICE
CERTIFICATE OF CORRECTION

PATENT NO. : 4,513,953
DATED : April 30, 1985
INVENTOR(S) : Werner Molders et al.

It is certified that error appears in the above-identified patent and that said Letters Patent is hereby corrected as shown below:

Col. 6, line 48, "claim 3" should read --claim 8--.

Signed and Sealed this

Twentieth Day of August 1985

[SEAL]

Attest:

DONALD J. QUIGG

Attesting Officer     Acting Commissioner of Patents and Trademarks